(12) United States Patent
Van Staalduinen

(10) Patent No.: US 11,084,655 B2
(45) Date of Patent: Aug. 10, 2021

(54) VEHICLE FOR MOVING A CONTAINER AND SYSTEM ALLOWING SUCH VEHICLE TO MOVE THE CONTAINER

(71) Applicant: LOGIQS B.V., Maasdijk (NL)

(72) Inventor: Gerrit Johannes Van Staalduinen, Maasdijk (NL)

(73) Assignee: LOGIQS B.V., Maasdijk (NL)

( * ) Notice: Subject to any disclaimer, the term of this patent is extended or adjusted under 35 U.S.C. 154(b) by 24 days.

(21) Appl. No.: 16/605,357

(22) PCT Filed: Apr. 12, 2018

(86) PCT No.: PCT/NL2018/050225
§ 371 (c)(1),
(2) Date: Oct. 15, 2019

(87) PCT Pub. No.: WO2018/190712
PCT Pub. Date: Oct. 18, 2018

(65) Prior Publication Data
US 2020/0047997 A1   Feb. 13, 2020

(30) Foreign Application Priority Data
Apr. 14, 2017   (NL) ..................................... 2018723

(51) Int. Cl.
*B65G 1/04* (2006.01)
*B65G 63/00* (2006.01)
*B66C 9/04* (2006.01)

(52) U.S. Cl.
CPC ......... *B65G 1/0414* (2013.01); *B65G 1/0478* (2013.01); *B65G 63/004* (2013.01); *B66C 9/04* (2013.01)

(58) Field of Classification Search
CPC .............. B65G 1/0478; B65G 1/0464
See application file for complete search history.

(56) References Cited

U.S. PATENT DOCUMENTS 4,470,742 A * 9/1984 Schindler ............. B65G 1/0478
                                                    414/286
7,753,637 B2 * 7/2010 Benedict ................. B66C 13/08
                                                    414/140.3
(Continued)

FOREIGN PATENT DOCUMENTS

EP           2962962 A1    1/2016
WO     2014/203126 A1   12/2014
(Continued)

OTHER PUBLICATIONS

Written Opinion of the International Searching Authority dated Aug. 9, 2018, issued in counterpart International Application No. PCT/NL2018/050225 (8 pages).
(Continued)

*Primary Examiner* — Jonathan Snelting
(74) *Attorney, Agent, or Firm* — Westerman, Hattori, Daniels & Adrian, LLP

(57) ABSTRACT

A vehicle for moving a container containing a hoisting device for hoisting the container from a first position, to hold it in a stored position at the bottom side of the vehicle and to lower the container from the stored position to the second position; a frame supporting the hoisting device; a first guide and second guide attached for guiding the vehicle along a first path in a first horizontal direction, and along a second path in a second horizontal direction transverse to the first direction; wherein the vehicle is arranged to run, in a first mode, along the first path if the first guide engages with the first path and the second guide is spaced apart from the second path, and, in a second mode, along the second path if the second guide engages with the second path and the first guide is spaced apart from the first path.

5 Claims, 5 Drawing Sheets

(56) References Cited

U.S. PATENT DOCUMENTS

| | | | |
|---|---|---|---|
| 7,909,558 B2* | 3/2011 | Benedict | E04H 6/182 |
| | | | 414/234 |
| 8,408,863 B1* | 4/2013 | Benedict | B63B 27/19 |
| | | | 414/803 |
| 9,884,720 B2* | 2/2018 | Van Den Berk | B65G 1/0492 |
| 10,294,025 B2* | 5/2019 | Hognaland | B65G 1/0478 |
| 10,336,540 B2* | 7/2019 | Gravelle | B65G 1/0478 |
| 2015/0127143 A1* | 5/2015 | Lindbo | B65G 1/0464 |
| | | | 700/218 |
| 2016/0272468 A1 | 9/2016 | Izumi | |
| 2019/0161273 A1* | 5/2019 | Ingram-Tedd | B65G 1/0464 |

FOREIGN PATENT DOCUMENTS

| | | | |
|---|---|---|---|
| WO | 2015/019055 A1 | 2/2015 | |
| WO | WO-2015193278 A1 * | 12/2015 | B65G 1/0464 |

OTHER PUBLICATIONS

International Search Report dated Aug. 9, 2018, issued in counterpart International Application No. PCT/NL2018/050225 (6 pages).

* cited by examiner

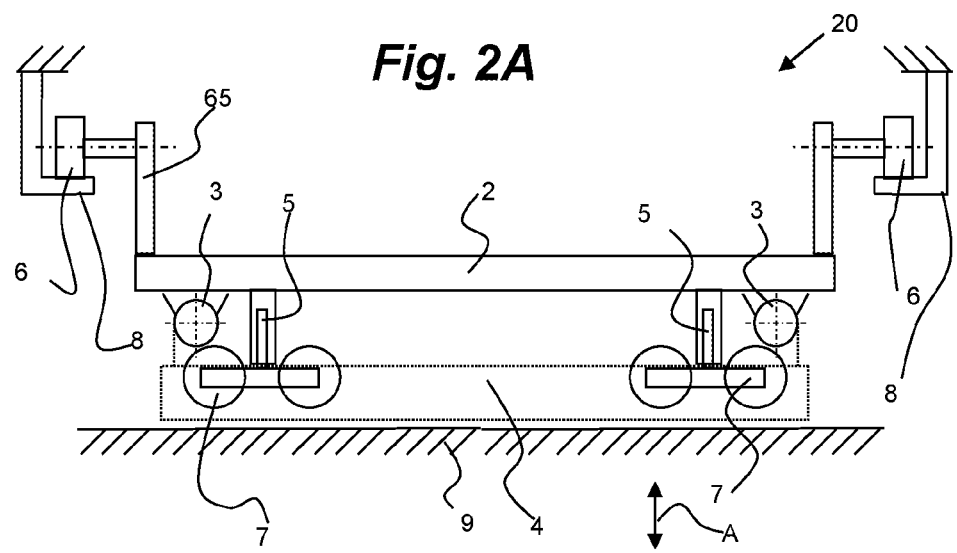
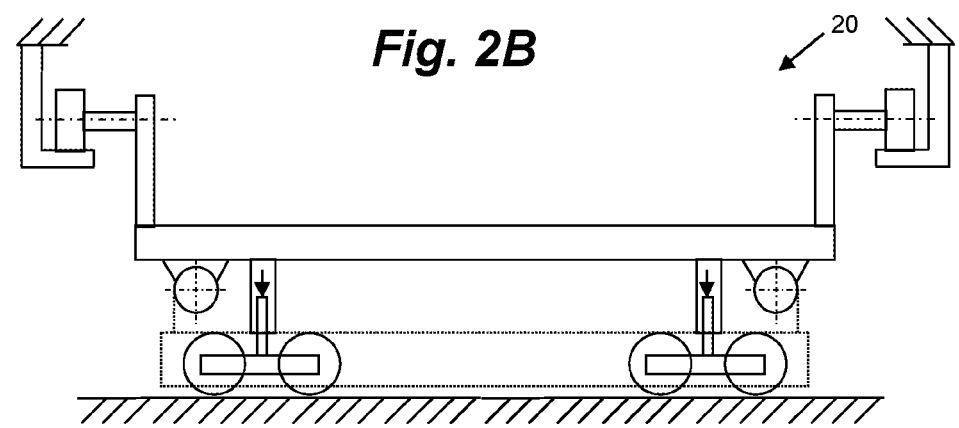
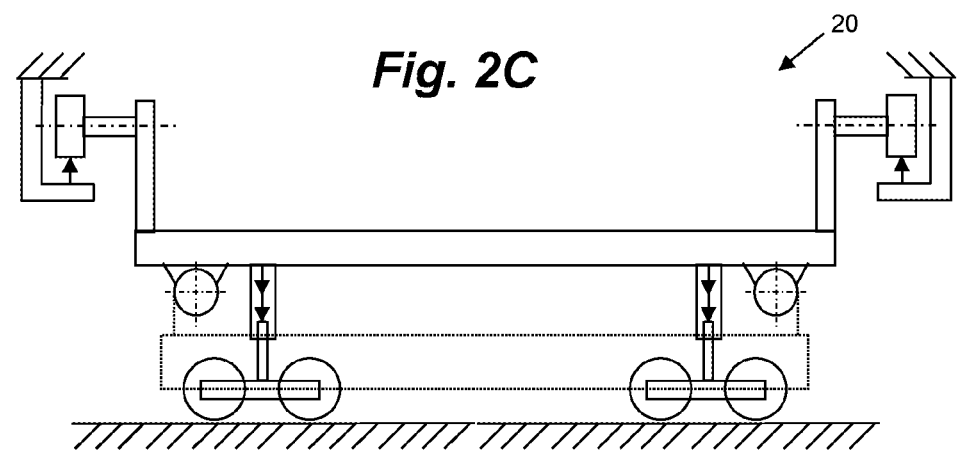

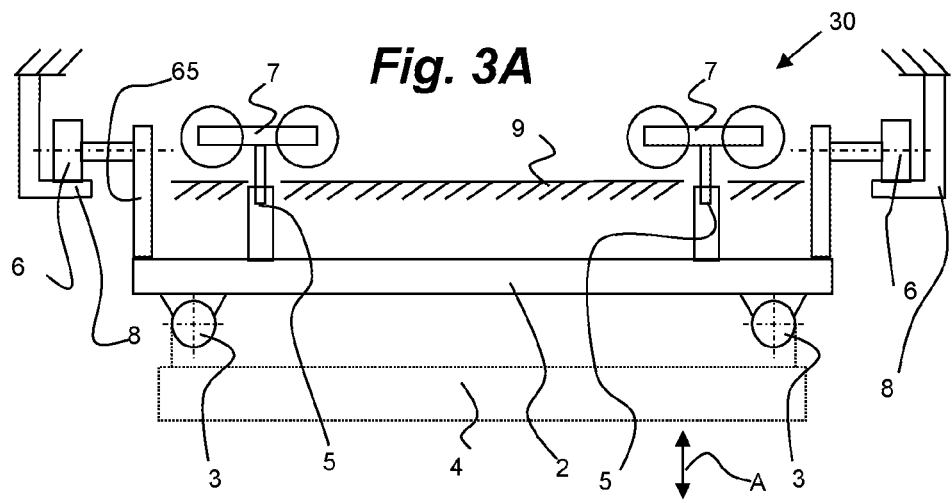
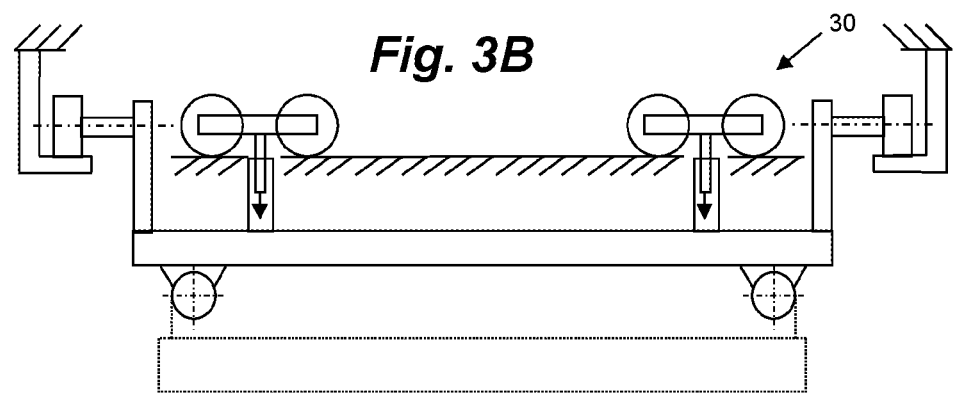
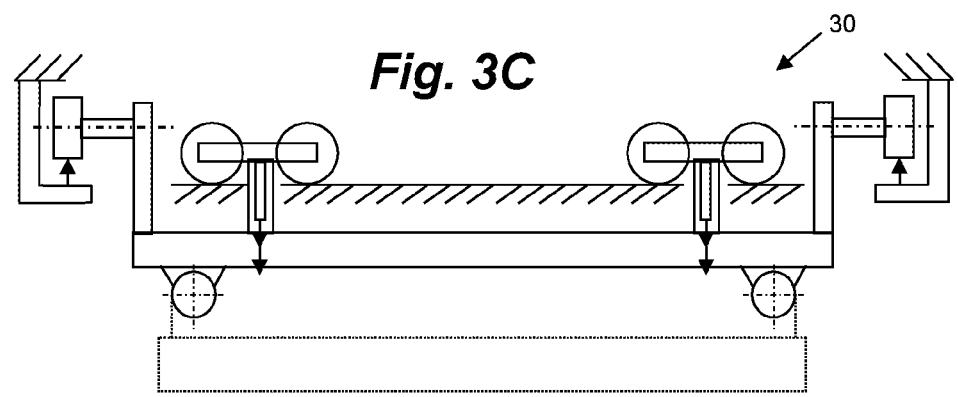

VEHICLE FOR MOVING A CONTAINER AND SYSTEM ALLOWING SUCH VEHICLE TO MOVE THE CONTAINER

FIELD OF THE INVENTION

A first aspect of the invention relates to a vehicle for moving a container from a first position to a second position, the vehicle comprising:
- a hoisting device for hoisting the container from the first position towards the vehicle, to hold it in a stored position at the bottom side of the vehicle, and to lower the container from the stored position to the second position;
- a frame supporting at least the hoisting device.

A second part of the invention relates to a guide rail system allowing the vehicle according to the first aspect of the invention to position the vehicle above the first position, to hoist the container from the first position towards the vehicle, to hold it in a stored position at the bottom side of the vehicle, and to lower the container from the stored position to the second position.

BACKGROUND OF THE INVENTION

Vehicles for transporting a load from a first position to a second position are generally known in the art. In logistic centers such as in transfer areas for transshipment of containers, trolleys are arranged to pick up a container by means of a hoisting device to be coupled to the container, then hoist the container towards the trolley. The trolley is capable of moving along a first path. Such a trolley system may be equipped with a second path fixed at the trolley, the second path being transverse to the first path so as to allow the container to move transverse to the first path. Since speed is a rather important criterion in determining the way to move the container from the first position to the second position, a controller is configured to start the trolley moving along the first path, even while the container has not ended up yet in the top most stored position. And in case the container needs to be moved transverse to the first path as well, which is often the case, the controller may be configured to start the container moving along the second path at the same time as well.

During operation of such trolley devices, the container follows the movement of the trolley along the first path and follows the movement with respect to the trolley along the second path while the container is suspended and hanging below the trolley. That means the container is travelling through a space available at the logistic area. During this travel, the containers often start swinging due to a dynamic way of moving the container along the first and the second path.

It is a drawback of such logistic systems the usage is restricted to movements from its first position to its second position of only one container at a time, the container crossing the space according to a fastest way determined by the controller of the trolley, the container being exposed to a set of dynamic forces.

It is an object of the invention to improve an efficient usage of logistic systems.

SUMMARY OF THE INVENTION

A first aspect of the invention provides a vehicle for moving a container from a first position to a second position, the vehicle comprising:

- a hoisting device for hoisting the container from the first position towards the vehicle, to hold it in a stored position at the bottom side of the vehicle, and to lower the container from the stored position to the second position;
- a frame supporting at least the hoisting device;
- a set of first guiding means attached to the frame for guiding the vehicle along a first path in a first horizontal direction, the set of first guiding means arranged to engage at both sides of the first path;
- a set of second guiding means for guiding the vehicle along a second path in a second horizontal direction transverse to the first direction, the set of second guiding means arranged to engage at both sides of the second path;

wherein the vehicle is arranged to run, in a first mode, along the first path if the set of first guiding means engages with the first path and the set of second guiding means is spaced apart from the second path, and, in a second mode, along the second path if the set of second guiding means engages with the second path and the set of first guiding means is spaced apart from the first path, and wherein a space is arranged under the vehicle to accommodate the container in the stored position, the space extending between a set of vertical planes through both the set of first guiding means and the set of second guiding means. Advantageous embodiments are defined in the dependent claims.

A second aspect of the invention provides a guide rail structure for movement of a vehicle according to the first aspect of the invention, wherein an array of the sets of first guide rails and the sets of second guide rails is arranged to allow the vehicle to follow a track determined by the controller of the vehicle to guide the vehicle carrying a container from the first position via its stored position to the second position.

DETAILED DESCRIPTION OF THE INVENTION

The first aspect of the invention relates to a vehicle for moving a container from a first position to a second position according to claim 1. To this end, the space immediate under the vehicle becomes available for accommodating the container in its top position and store it there during travel from a first stored position locating perpendicular above the first position to a second stored position locating perpendicular above the second position. The space extending between the first position of the container and the first stored position of the container forms a first hoistway for the container to be hoisted from the first position to the first stored position. Similarly, the space extending between the second position of the container and the second stored position of the container forms a second hoistway for the container to be lowered from the second stored position to the second position, last said hoistway actually forming a lowering way. To this end, the hoisting device is arranged at the frame so as to hoist and/or lower the container in the hoistway downwardly extending from the frame, in such a way that the hoistway, when vertically projected to the frame, is substantially overlapping an area enclosed by the set of first guiding means as well as the set of second guiding means vertically projected to the frame. As such, a stable vehicle is provided since a working line of the container load to be carried by the vehicle is within the area enclosed by the set of first guiding means as well as the set of second guiding means vertically projected to the frame. In this way it, the design of the vehicle allows a light weight construction since there is no need to compensate for unbalance due to carrying the container load. The vehicle restricts movement of the container in a vertical direction in the first and second hoistway, and in a horizontal direction when the container is locating in its stored position under the vehicle. To this end a further vehicle may be in operation independent from the vehicle without the possibility of interference or collision, so that both the vehicle and the further vehicle allow for a more efficient usage of the logistic system.

In an embodiment, connection means are arranged to attach each one of the second guiding means to the frame, the connection means being adjustable along a height dimension so as to allow the vehicle to:

run, in the first mode, along the first path when the set of first guiding means engages with the first path and the set of second guiding means is spaced apart from the second path; and run, in the second mode, along the second path when the set of second guiding means engages with the second path and the set of first guiding means is spaced apart from the first path. In this way, the vehicle is capable of switching between running along the first path in the first mode and running along the second path in the second mode, so as to allow the container to follow a route from the first stored position to the second stored position via the first path and subsequently the second path.

In an embodiment, the first path is formed by a set of first guide rails and the second path is formed by a set of second guide rails, and wherein controlling means are arranged to control the connection means to set the vehicle from the first mode to the second mode by moving the set of second guiding means, with respect to the frame, downward to make the set of second guiding means to contact a set of second guide rails, and to continue moving the set of second guiding means, with respect to the frame, downward to lift the set of first guiding means attached to the frame to release the set of first guiding means from the set of first guide rails. In this way, the connection means are capable of lifting the frame including the hoisting device carrying, in use, the container from a lower position wherein the vehicle is capable of running along the first path, the vehicle being in its first mode, to a higher position wherein the vehicle is capable of running along the second path, the vehicle being in its second mode. In this way, the connection means is capable of lifting the frame of the vehicle including the hoisting device carrying the container, from a lower position wherein the vehicle is capable of running along the first path, the vehicle being in its first mode, to a higher position wherein the vehicle is capable of running along the second path, the vehicle being in its second mode. And vice versa, the controlling means are arranged to control the connection means to set the vehicle from the second mode to the first mode by moving the set of second guiding means, with respect to the frame, upward to make the set of first guiding means to contact a set of first guide rails, and to continue moving the set of second guiding means, with respect to the frame, upward to lift the set of second guiding means to release the set of second guiding means from the set of second guide rails. In this way, the connection means is capable of lowering the frame of the vehicle including the hoisting device carrying the container, from a higher position wherein the vehicle is capable of running along the second path, the vehicle being in its second mode, to a lower position wherein the vehicle is capable of running along the first path, the vehicle being in its first mode.

In an embodiment, a top portion of the space is surrounded at lateral sides by both the set of first guiding means and the set of second guiding means so as to surround the space at lateral sides to allow the container to be stored in the space between the set of first guiding means and the set of second guiding means, wherein the space downwardly extends to nearly the lowest portion of the set of first guiding means to be able to move the container in its stored position over both the first and the second path, and wherein the container to be transported is designed to fit in the space for accommodating the container in its stored position. In this way, the container to be transported may be lifted beyond the set of guide rails being the nearest to the bottom side of the frame so as to lift the container over the highest guide rails to allow the container to be moved either along the first path or along the second path without crossing a set of guide rails. In such embodiment, horizontal transportation of the container takes place above the level of the first and the second guide rails, allowing a straight, flush and continuous rail track system.

In an embodiment, the set of first guiding means are locating at a level extending above the space, wherein the set of second guiding means surrounds two opposing lateral sides of the space so as to allow the container to be stored in the space, wherein the space downwardly extends to nearly the lowest portion of the set of second guiding means to move the container in its stored position under the first path along the second path and/or to move the container in its stored position over the second path along the first path, and wherein the container to be transported is designed to fit in the space for accommodating the container in its stored position. In this way, the container to be transported may be lifted beyond the set of second guide rails of the second path, whist the bottom side of the frame is lower than the bottom side of the set of first guide rails, so as to move the container in an intermediate space forming a layer between a level under the set of first guide rails and over a level of the set of second guide rails.

In an embodiment, both the set of first guiding means and the set of second guiding means are locating at a level extending above the space so as to allow the container to be stored in the space to move the container in its stored position both under the first path along the second path as well as under the second path along the first path. In this way, the container to be transported may stay, in the space, at a lower level than both the set of first guide rails and the set of second guide rails, so as to move the container being in stored position in the space, under both the first and the second path.

In an embodiment, the hoisting device is fixed at the downwardly facing bottom side of the frame. In this way, the hoisting device is locating in the hoistway downwardly extending from the frame, in such a way that the hoistway, when vertically projected to the frame, is substantially overlapping an area enclosed by the set of first guiding means as well as the set of second guiding means vertically projected to the frame.

In an embodiment, the container is having an open top to allow the container to be loaded with goods such as plants, wherein the container including the goods is having a predetermined height dimension to fit in the space for accommodating the container in its stored position. In this way, the vehicle is capable to move goods from the first position to the second position in which second position conditions for the goods are deemed better than in the first condition so as to provide a better environment for the goods or a better climate for the plants.

The second aspect of the invention relates to a guide rail structure for moving a container from a first position to a second position. To this end, a structure comprising guide rails forming a network of paths is provided to allow the vehicle to move along the track determined by the controller of the vehicle, the controller for example receiving commands from a further controller controlling a plurality of vehicle controllers.

In an embodiment, the set of first guide rails comprises first openings to form passage ways to allow first suspension means fixing the first guiding means to the frame to pass through the set of first guide rails when the vehicle moves along the second path. In this way, the guide rail structure is adapted to allow parts such as construction parts like the first suspension means to cross the line wherein the set of first guide rails are locating so as to prevent the first suspension means from colliding with the set of first guide rails.

In an embodiment, the set of first guide rails comprises first openings to form passage ways to allow first suspension means fixing the first guiding means to the frame to pass through the set of first guide rails when the vehicle moves along the second path, and the set of second guide rails comprises second openings to form passage ways to allow second suspension means fixing the second guiding means to the frame to pass through the set of second guide rails when the vehicle moves along the first path. In this way, the guide rail structure is adapted to allow parts such as construction parts like the first suspension means to cross the line wherein the set of first guide rails are locating so as to prevent the first suspension means from colliding with the set of first guide rails, and to allow parts such as construction parts like the second suspension means to cross the line wherein the set of second guide rails are locating so as to prevent the second suspension means from colliding with the set of second guide rails.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 1 B is a front view of the vehicle according to FIG. 1A, wherein the vehicle is at an intermediate position between the first mode and a second mode to run along a second path guided by the set of second guiding means, the first path intersecting the second path;

FIG. 1 C is a front view of the vehicle according to FIG. 1A or 1 B, the vehicle being in the second mode to be able to run along the second path guided by the set of second guiding means;

FIG. 2A is a front view of the vehicle according to the invention, the vehicle being in a first mode to be able to run along a first path guided by a set of first guiding means;

FIG. 2B is a front view of the vehicle according to FIG. 2A, wherein the vehicle is at an intermediate position between the first mode and a second mode to run along a second path guided by the set of second guiding means, the first path crossing over the second path;

FIG. 2C is a front view of the vehicle according to FIG. 2A or 2B, the vehicle being in the second mode to be able to run along the second path guided by the set of second guiding means;

FIG. 3A is a front view of the vehicle according to the invention, the vehicle being in a first mode to be able to run along a first path guided by a set of first guiding means;

FIG. 3B is a front view of the vehicle according to FIG. 3A, wherein the vehicle is at an intermediate position between the first mode and a second mode to run along a second path guided by the set of second guiding means, the first path crossing or intersecting the second path;

FIG. 3C is a front view of the vehicle according to FIG. 3A or 3B, the vehicle being in the second mode to be able to run along the second path guided by the set of second guiding means;

DETAILED DESCRIPTION OF THE DRAWINGS

It should be noted that the above-mentioned embodiments illustrate rather than limit the invention, and that those skilled in the art will be able to design many alternative embodiments.

Figure 1A:
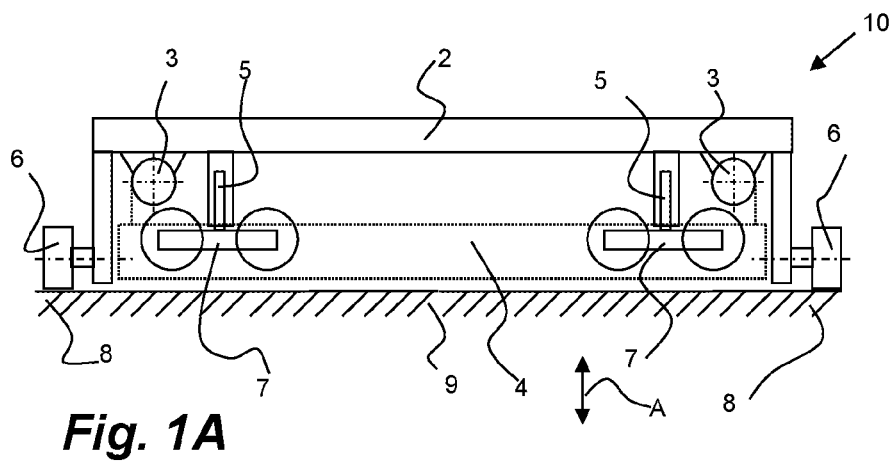
FIG. 1 A is a front view of the vehicle according to the invention, the vehicle being in a first mode to be able to run along a first path guided by a set of first guiding means.
Figure 1B:
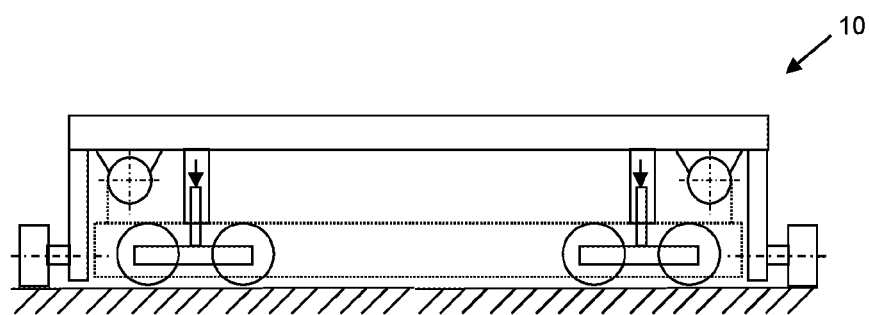
Figure 1C:
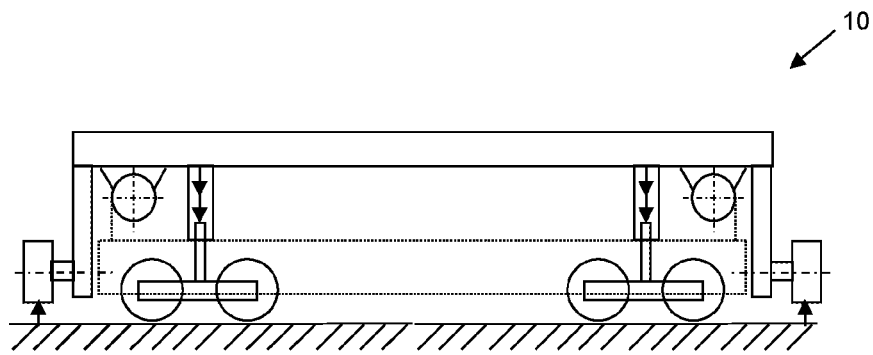

FIGS. 1A, 1 B, and 1C show a vehicle 10, according to the invention, in front view, the vehicle 10 comprising a frame 2, and a hoisting device 3 for hoisting a container 4 from a first position under the vehicle 10 up to a stored position immediately under the vehicle 10. FIG. 1 shows the container 4 in dotted lines indication the container 4 being in the stored position. The vehicle 10 comprising the hoisting device 3 is arranged to vertically hoist and lower the container 4 parallel with the arrow A.

Figure 4:
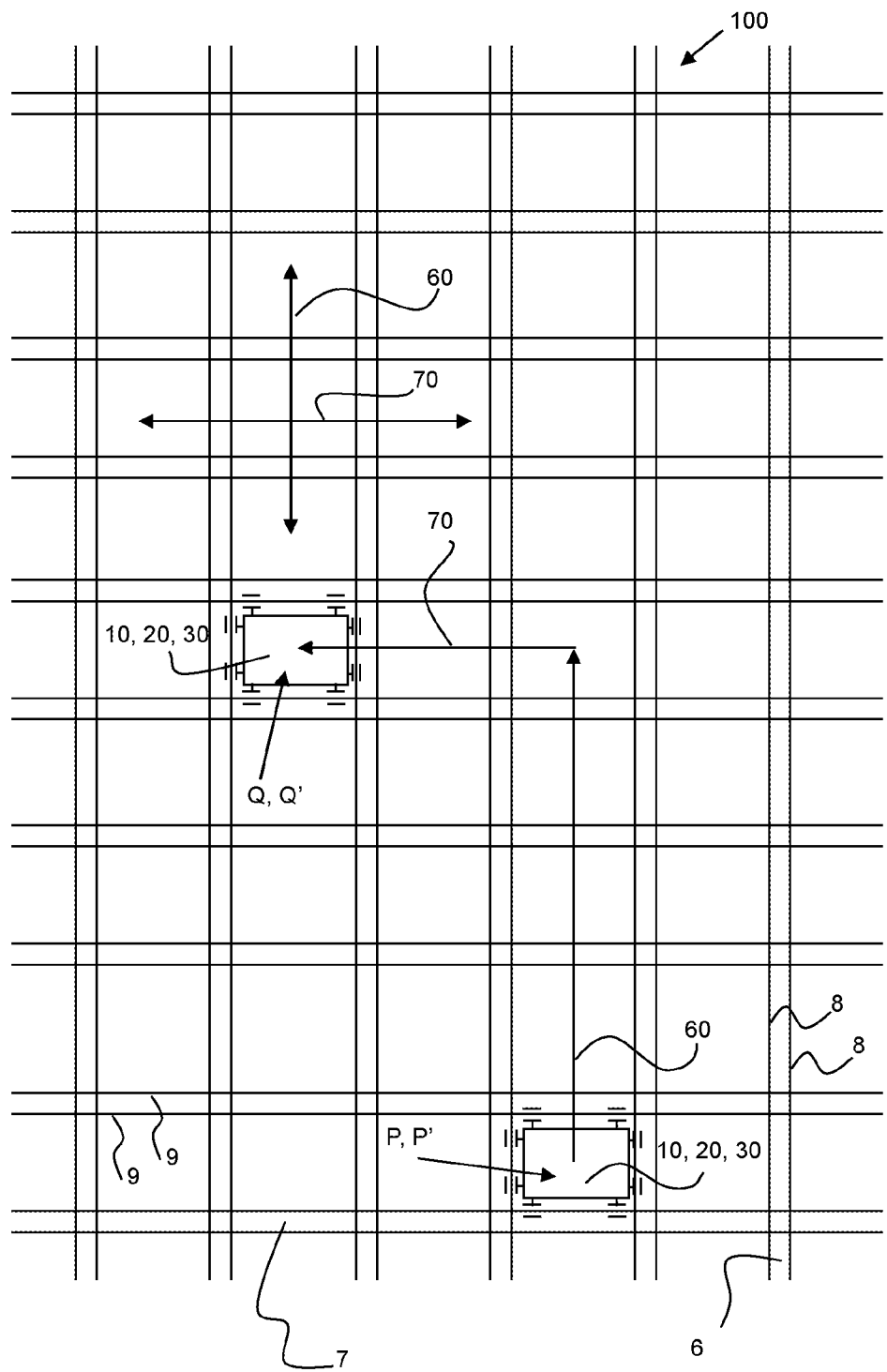
FIG. 4 is a top view of the guide rail structure according to the second aspect of the invention for movement of a vehicle according to the first aspect of the invention.

The vehicle 10 comprises a set of first guiding means 6 for supporting and guiding the vehicle 10 along a first path 60 and the vehicle 10 comprises a set of second guiding means 7 for supporting and guiding the vehicle 10 along a second path 70. FIG. 4 shows a top view of a guide rail system 100 comprising an array of the sets of first guide rails 8 and the sets of second guide rails 9 to allow the vehicle 10 to follow a track determined by a controller (not shown) of the vehicle 10 to guide the vehicle 10 carrying a container 4 from the first position P to the second position Q.

According to the invention, a space is arranged under the vehicle to accommodate the container 4 in the stored position, the space extending between a set of vertical planes through both the set of first guiding means 6 and the set of second guiding means 7.

To switch the vehicle 10 between the first path 60 and the second path 70, connection means 5 are arranged to attach each one of the second guiding means 6 to the frame 2, the connection means 5 being adjustable along a height dimension, parallel to the arrow A. The connection means 5 allow the vehicle 10 to run, in the first mode shown in FIG. 1, along the first path 60 when the set of first guiding means engages 6 with the first path 60 and the set of second guiding means 7 is spaced apart from the second path 70. The connection means 5 allow the frame 2 to be moved with respect of the set of second guiding means 7 to allow the vehicle 10 to run, in the second mode shown in FIG. 1C, along the second path 70 when the set of second guiding means 7 engages with the second path 70 and the set of first guiding means 6 is spaced apart from the first path 60.

In this example, the first path 60 is formed by a first pair of guide rails 8 and the set of first guiding means 6 is comprised of a set of second guide rollers 6 to allow the vehicle 10 to run in the first path 60 while the set of guide rollers 6 is driving over the first pair of guide rails 8. In a similar way, the second path 70 is formed by a second pair of guide rails 9 and the set of second guiding means 7 is comprised of a set of second guide rollers 7 to allow the vehicle 10 to run in the second path 70 while the set of guide rollers 7 is driving over the second pair of guide rails 9.

The vehicle 10 is equipped with controlling means (not shown) to control the connection means 5 to set the vehicle from the first mode shown in FIG. 1 A to the second mode shown in FIG. 1 C by moving the set of second guiding means 7, with respect to the frame 2, downward to make the set of second guiding means 7 to contact a set of second guide rails 9, as shown in FIG. 1 B, and to continue moving the set of second guiding means 7, with respect to the frame 2, downward to lift the set of first guiding means 6 attached to the frame 2 to release the set of first guiding means 6 from the set of first guide rails 8, as shown in FIG. 1 C.

Vice versa, the controlling means are configured to control the connection means 5 to set the vehicle 10 from the second mode shown in FIG. 1 C to the first mode shown in FIG. 1 A by moving the set of second guiding means 7, with respect to the frame 2, upward to make the set of first guiding means 6 to contact a set of first guide rails 8 as shown in FIG. 1 B, and to continue moving the set of second guiding means 7, with respect to the frame 2, upward to lift the set of second guiding means 7 to release the set of second guiding means 7 from the set of second guide rails 9, as shown in FIG. 1A.

The vehicle 10 according to the invention is formed in such a way that the space under the vehicle 10 is arranged to accommodate the container 4 in its stored position, wherein the container 4 is arranged to fit in the space when it is locating in its stored position under the vehicle 10. The vehicle 10 according to FIGS. 1A, 1 B, and 1 C allows the container 4 to be stored at a level which is higher than the set of first and second guide rails 8, 9. For a horizontal transport of the container 4 from a first stored position locating above the first position, to a second stored position locating above the second position, the container 4 may be moved at a level extending above the set of first and second guide rails 8, 9 as well, providing an open system of guide rails 8, 9 without any intersection rail portions.

Specifically for the vehicle 10 depicted in FIGS. 1A, 1 B, and 1 C, the space to store the container 4, is surrounded at lateral sides by both the set of first guiding means 6 and the set of second guiding means 7 so as to surround the space at lateral sides to allow the container 4 to be stored in the space between the set of first guiding means 6 and the set of second guiding means 7. The space downwardly extends to nearly the lowest portion of the set of first guiding means 6 to be able to move the container 4 over both the first and the second path 60, 70, from the first stored position to the second stored position. To this end, the container 4 to be transported is designed to fit in the space for accommodating the container 4 in its stored position.

FIGS. 2A, 2B, and 2C show a vehicle 20 similar to the vehicle 20 shown in FIGS. 1A, 1 B, and 1 C, wherein for example the hoisting device 3 and the set of second guiding means 7 are locating at a downwardly extending portion of the frame 2. The vehicle 20 differs with the vehicle depicted in FIGS. 2A, 2B, and 2C in that a set of first suspension means 65 fixing the set of first guiding means 6 to the frame 2, extends upward so as to position the set of first guiding means 6, such as the set of first guiding rollers 6, above the downwardly extending portion of the frame 2. To this end, the set of first guiding means 6 extends above the space, wherein the set of second guiding means 7 surrounds two opposing lateral sides of the space so as to allow the container 4 to be stored in the space.

In this example, the space downwardly extends to nearly the lowest portion of the set of second guiding means 7 to move the container 4 under the first path 60 along the second path 70 and/or to move the container 4 over the second path 70 along the first path 60, from the first stored position P' to the second stored position Q'. The container 4 to be transported is designed to fit in the space for accommodating the container 4 in its stored position.

Figure 5:
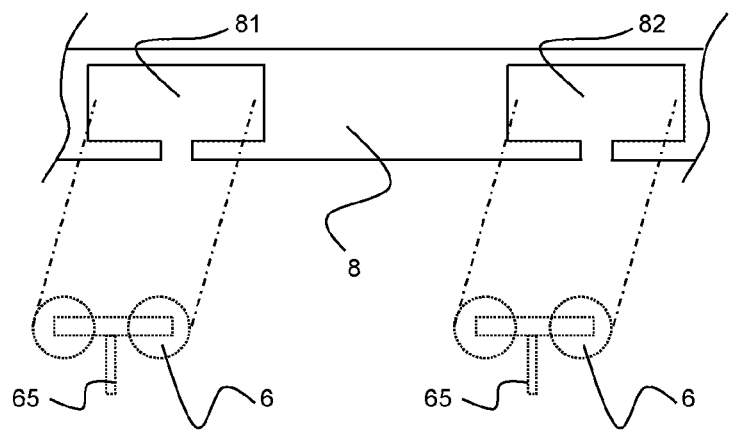
FIG. 5 is a side view of a first guide rail provided with openings so as to form a passage way allowing the vehicle according to FIG. 2 to cross the first guide rail.

For a movement of the vehicle 20 along the second path 70, the set of first guiding means 6, including the set of first suspension means 65 fixing the set of first guiding means 6 to the frame 2, intersects the set of second guide rails 8 and to allow the vehicle 20 to move along the second path 70, the set of first guide rails 8 is provided with first openings 81, 82 to form passage ways to allow the set of first suspension means 65 fixing the first guiding means 6 to the frame 2 to pass through the first guide rails 8 when the vehicle 20 moves along the second path 70. The openings 81, 82 depicted in side view in FIG. 5 allow the first guiding means 6 there to pass through.

FIGS. 3A, 3B, and 3C show a vehicle 30 similar to the vehicle 30 shown in FIGS. 1A, 1 B, and 1C, wherein for example the hoisting device 3 and the set of second guiding means 7 are locating at a downwardly extending portion of the frame 2. The vehicle 30 differs with the vehicle depicted in FIGS. 3A, 3B, and 3C in that both a set of first suspension means 65 fixing the set of first guiding means 6 to the frame 2, extends upward so as to position the set of first guiding means 6, such as the set of first guiding rollers 6, above the downwardly extending portion of the frame 2. And a set of second suspension means 75 fixing the set of second guiding means 7 to the frame 2, extends upward so as to position the set of second guiding means 6, such as the set of second guiding rollers 6, above the downwardly extending portion of the frame 2.

To this end, both the set of first and second guiding means 6, 7 extends above the space. The space downwardly extending to nearly the lowest portion of the set of first or second guiding means 6, 7 allows the container 4 to be moved under both the first and the second path 60, 70, from the first stored position P' to the second stored position Q'.

Figure 6A:
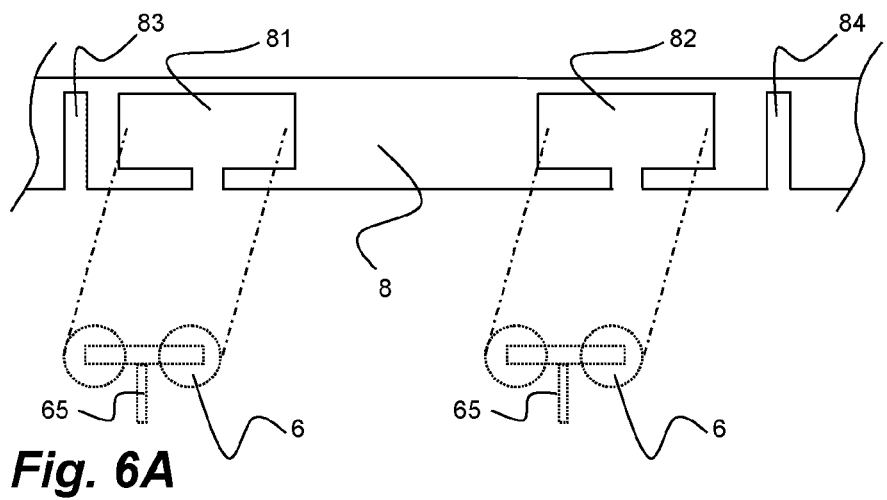
FIG. 6A is a side view of a first guide rail provided with openings so as to form a passage way allowing the vehicle according to FIG. 3 to cross the first guide rail.

For a movement of the vehicle 30 along the second path 70, the set of first guiding means 6, including the set of first suspension means 65 fixing the set of first guiding means 6 to the frame 2, intersects the set of second guide rails 8 and to allow the vehicle 30 to move along the second path 70, the set of first guide rails 8 is provided with first openings 81, 82, 83, 84 to form passage ways to allow the set of first and second suspension means 65, 75 fixing the first and second guiding means 6, 7 to the frame 2 to pass through the first guide rails 8 when the vehicle 30 moves along the second path 70. The openings 81, 82, 83, 84 depicted in side view in FIG. 6A allow the first guiding means 6 there to pass through.

Figure 6B:
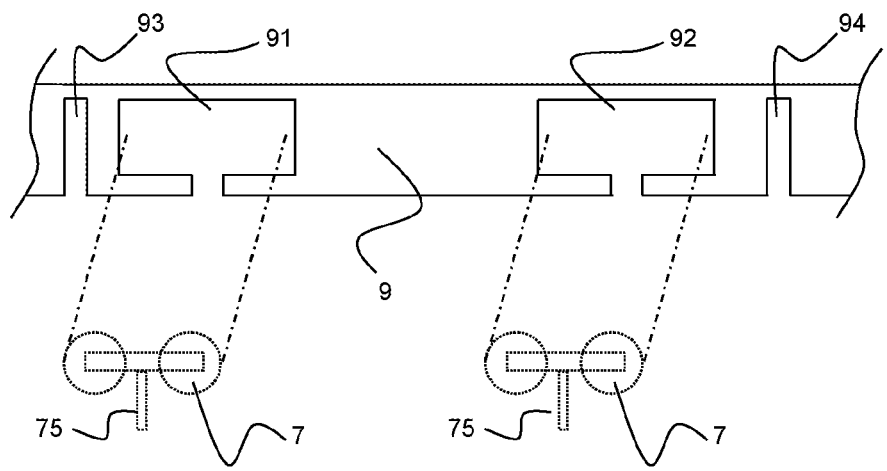
FIG. 6B is a side view of a second guide rail provided with openings so as to form a passage way allowing the vehicle according to FIG. 3 to cross the second guide rail; It should be noted that items which have the same reference numbers in different figures, have the same structural features and the same functions, or are the same signals. Where the function and/or structure of such item has been explained, there is no necessity for repeated explanation thereof in the detailed description.

For a movement of the vehicle 30 along the first path 60, the set of second guide rails 9 is provided with second openings 91, 92, 93, 94 to form passage ways to allow the set of first and second suspension means 65, 75 fixing the first and second guiding means 6, 7 to the frame 2 to pass through the second guide rails 9 when the vehicle 30 moves along the first path 60. The openings 91, 92, 93, 94 depicted in side view in FIG. 6B allow the second guiding means 7 there to pass through.

In the claims, any reference signs placed between parentheses shall not be construed as limiting the claim. Use of the verb "comprise" and its conjugates does not exclude the presence of elements or steps other than those stated in a claim. The article "a" or "an" preceding an element does not exclude the presence of a plurality of such elements. The invention may be implemented by means of rdware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A vehicle for moving a container from a first position to a second position, the vehicle comprising:
    a hoisting device for hoisting the container from the first position towards the vehicle, to hold the container in a stored position at a bottom side of the vehicle, and to lower the container from the stored position to the second position;
    a frame supporting at least the hoisting device;
    a set of first guiding means attached to the frame for guiding the vehicle along a first path-in a first horizontal direction, the set of first guiding means arranged to engage at both sides of the first path; and
    a set of second guiding means for guiding the vehicle along a second path in a second horizontal direction transverse to the first direction, the set of second guiding means arranged to engage at both sides of the second path,
    wherein the vehicle is arranged to run, in a first mode, along the first path if the set of first guiding means engages with the first path and the set of second guiding means is spaced apart from the second path, and, in a second mode, along the second path if the set of second guiding means engages with the second path and the set of first guiding means is spaced apart from the first path,
    wherein a space is arranged under the vehicle to accommodate the container in the stored position, the space extending between a set of vertical planes through both the set of first guiding means and the set of second guiding means,
    wherein connection means are arranged to attach each one of the set of second guiding means to the frame, the connection means being adjustable along a height dimension so as to allow the vehicle to either run in the first mode, or to run in the second mode,
    wherein the first path is formed by a set of first guide rails and the second path is formed by a set of second guide rails, and wherein the connection means is capable of setting the vehicle from the first mode to the second mode by moving the set of second guiding means, with respect to the frame, downward to make the set of second guiding means to contact the set of second guide rails, and to continue moving the set of second guiding means, with respect to the frame, downward to lift the set of first guiding means attached to the frame to release the set of first guiding means from the set of first guide rails, and
    wherein the set of first guiding means are locating at a level extending above the space, wherein the set of second guiding means surrounds two opposing lateral sides of the space so as to allow the container to be stored in the space, wherein the space downwardly extends to nearly the lowest portion of the set of second guiding means to move the container in the stored position under the first path along the second path and/or to move the container in the stored position over the second path along the first path, and wherein the container to be transported is designed to fit in the space for accommodating the container in the stored position.

2. The vehicle according to claim 1, wherein a top portion of the space is surrounded at lateral sides by both the set of first guiding means and the set of second guiding means so as to surround the space at lateral sides to allow the container to be stored in the space between the set of first guiding means and the set of second guiding means, wherein the space downwardly extends to nearly a lowest portion of the set of first guiding means to be able to move the container in the stored position over both the first and the second path, and wherein the container to be transported is designed to fit in the space for accommodating the container in the stored position.

3. The vehicle according to claim 1, wherein both the set of first guiding means and the set of second guiding means are locating at a level extending above the space so as to allow the container to be stored in the space to move the container in the stored position both under the first path along the second path as well as under the second path along the first path.

4. The vehicle according to claim 1, wherein the hoisting device is fixed, in use, at a downwardly facing bottom side of the frame.

5. The vehicle according to claim 1, wherein the container is having an open top to allow the container to be loaded with goods, wherein, in use, the container including the goods is having a predetermined height dimension to fit in the space for accommodating the container in the stored position.

* * * * *